(12) United States Patent
Liu et al.

(10) Patent No.: US 9,344,501 B1
(45) Date of Patent: *May 17, 2016

(54) COMMUNICATION WITH MULTIPLE STORAGE PROCESSORS USING NETWORK INFRASTRUCTURE

(71) Applicant: EMC Corporation, Hopkinton, MA (US)

(72) Inventors: Qing Liu, Grafton, MA (US); Ying Guo, Northborough, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/332,434

(22) Filed: Jul. 16, 2014

Related U.S. Application Data

(63) Continuation of application No. 11/904,199, filed on Sep. 26, 2007, now Pat. No. 8,819,104.

(51) Int. Cl.
 *G06F 15/167* (2006.01)
 *H04L 29/08* (2006.01)

(52) U.S. Cl.
 CPC .................................. *H04L 67/1097* (2013.01)

(58) Field of Classification Search
 None
 See application file for complete search history.

(56) References Cited

U.S. PATENT DOCUMENTS

| | | | | |
|---|---|---|---|---|
| 5,349,656 A | * | 9/1994 | Kaneko | G06F 9/4881 718/102 |
| 6,128,279 A | * | 10/2000 | O'Neil | H04L 67/1008 370/229 |
| 7,124,179 B1 | * | 10/2006 | Bauer | H04L 41/0233 707/999.103 |
| 7,313,614 B2 | * | 12/2007 | Considine | G06F 11/2074 709/217 |
| 2006/0161420 A1 | * | 7/2006 | Sugawara | G06F 9/30174 703/26 |

* cited by examiner

Primary Examiner — Brian P Whipple
(74) Attorney, Agent, or Firm — Muirhead and Saturnelli, LLC

(57) ABSTRACT

A system that provides efficient expansion capability of a storage unit under test including multiple storage processors and reduces a number of required Ethernet ports on a client device and a reduced number of physical connections on the client device. A first processor and a peer processor of a storage processor system may be coupled to counterpart processors on one or more other storage processor systems using direct port-to-port connections and/or using a network infrastructure. A command from the client device may be passed among first processors and peer processors of the multiple storage processor systems until the correct destination processor for the command is reached, and data packets may be passed from a source processor of a storage processor system through processors of other storage processor systems until the client device is reached.

14 Claims, 15 Drawing Sheets

COMMUNICATION WITH MULTIPLE STORAGE PROCESSORS USING NETWORK INFRASTRUCTURE

RELATED APPLICATIONS

This application is a continuation of U.S. application Ser. No. 11/904,199 filed on Sep. 26, 2007 (pending), which is incorporated by reference herein.

TECHNICAL FIELD

This application relates to the field of storage systems and processors and, more particularly, to communication with multiple storage processors.

BACKGROUND OF THE INVENTION

A storage system may include a storage enclosure with a storage processor system, which may include two storage processors. Diagnostic testing may be performed on the storage processors and controlled by a client device using a TCP network to diagnose hardware problems. A storage unit or units, for example subject to diagnostic testing at manufacture, may include multiple storage processor systems, e.g., four or more storage processors systems. Each storage processor may include two Ethernet ports, a management port (i.e., LAN 0) and a service port (i.e., LAN1), and each of these ports may have a programmatically assigned static IP address that does not change. Further, each storage processor may require one Ethernet port on the client device in order to communicate and run the diagnostic tests. Such a communication method with multiple storage processor systems may be expensive and not easily expandable as the number of storage processor systems in a storage unit under test is increased.

According, it would be desirable to provide a communication system with multiple storage processors, such as used with diagnostic testing, that is cost efficient and easily expandable.

SUMMARY OF THE INVENTION

According to the system described herein, a system for communicating with multiple storage systems includes a first storage processor system, and a second storage processor system, wherein each of the first storage processor system and the second storage processor system includes a first processor and a peer processor. A client device may be coupled to the first storage processor system and the second storage processor system via a network infrastructure, wherein a port of the client device is connected to the network infrastructure, wherein a port of at least one of the first processor and the peer processor of the first storage processor system is connected to the network infrastructure, and wherein a port of at least one of the first processor and the peer processor of the second storage processor system is connected to the network infrastructure. A port of the first processor of the first storage processor system, a port of the peer processor of the first storage processor system, a port of the first processor of the second storage processor system and a port of the peer processor of the second storage processor system may all be connected to the network infrastructure. The first storage processor system, the second storage processor system and the client device may all be on the same network and each have different IP addresses.

The first processor of the first storage processor system may assess a command received from the client device and, if the first processor of the first storage processor system determines that the first processor is not a correct destination processor to process the command, may pass the command to the first processor of the second storage processor system via the network infrastructure. The peer processor of the first storage processor system may assess a command received from the client device and, if the peer processor of the first storage processor system determines that the peer processor is not a correct destination processor to process the command, may pass the command to the peer processor of the second storage processor system via the network infrastructure. The first processor of the first storage processor system may assess a command received from the client device and, if the first processor of the first storage processor system determines that the first processor is not a correct destination processor to process the command, may pass the command to the peer processor of the first storage processor system. The first processor of the first storage system passes the command to the peer processor of the first storage system via the network infrastructure and/or via a direct connection.

At least one additional storage processor system may be coupled to the network infrastructure, wherein the at least one additional storage processor system includes a first processor and a peer processor, and wherein a port of at least one of the first processor and the peer processor of the additional storage processor system is connected to the network infrastructure. If the command is received at the first processor of the second storage processor system and the first processor of the second storage processor system is determined to not be the correct destination processor, then the command may be passed to the first processor of the at least one additional storage processor system via the network infrastructure. If the command is received at the peer processor of the second storage processor system and the peer processor of the second storage processor system is determined to not be the correct destination processor, then the command may be passed to the peer processor of the at least one additional storage processor system via the network infrastructure.

According further to the system described herein, a method for communicating with multiple storage systems includes receiving a command from a client device at a first storage processor system that is coupled to a second storage processor system via a network infrastructure, wherein each of the first and second storage processor systems includes a first processor and a peer processor. The command may be assessed with respect to a particular one of the first processor and the peer processor of the first storage processor system. If the particular one of the first processor and the peer processor of the first storage processor system is determined to be a correct destination processor to process the command, then the command may be processed. If the particular one of the first processor and the peer processor of the first storage processor system is determined to not be the correct destination processor, then the command may be passed to a different processor via the network infrastructure. The different processor may be at least one of: the other of the first processor and the peer processor of the first storage processor system, the first processor of the second storage processor system, and the peer processor of the second storage processor system.

A port of the first processor of the first storage processor system may be connected to the network infrastructure, a port of the first processor of the second storage processor system may be connected to the network infrastructure, a port of the peer processor of the first storage processor system may be connected to the network infrastructure, and a port of the peer processor of the second storage processor system may be connected to the network infrastructure. If the command is received at the first processor of the first storage processor system and the first processor of the first storage processor system is determined to not be the correct destination processor, then the command may be passed to the first processor of the second storage processor system via the network infrastructure. If the command is received at the peer processor of the first storage processor system and the peer processor of the first storage processor system is determined to not be the correct destination processor, then the command may be passed to the peer processor of the second storage processor system. Further, a data packet generated at a source processor may be transmitted via the network infrastructure and at least one of the first storage processor system and the second storage processor system to the client device.

At least one additional storage processor system may be coupled to network infrastructure, wherein the at least one additional storage processor system includes a first processor and a peer processor. If the command is received at the first processor of the second storage processor system and the first processor of the second storage processor system is determined to not be the correct destination processor, then the command may be passed to the first processor of the at least one additional storage processor system via the network infrastructure. If the command is received at the peer processor of the second storage processor system and the peer processor of the second storage processor system is determined to not be the correct destination processor, then the command may be passed to the peer processor of the at least one additional storage processor system via the network infrastructure.

According further to the system described herein, a computer program product, stored on a computer-readable medium, for communicating with multiple storage processor systems includes executable code that receives a command at a first storage processor system that is coupled to a second storage processor system via network infrastructure, wherein each of the first storage processor system and the second storage processor system includes a first processor and a peer processor. Executable code may determine if a particular one of the first processor and the peer processor of the first storage processor system is a correct destination processor to process the command. Executable code may pass the command to a different processor if the particular one of the first processor and the peer processor of the first storage processor system is not the correct destination processor to process the command. The different processor may be at least one of: the other of the first processor and the peer processor of the first storage device, the first processor of the second storage device, and the peer processor of the second storage device. If the command is received at the first processor of the first storage processor system and the first processor of the first storage processor system is determined to not be the correct destination processor, then the command is passed to the first processor of the second storage processor system via the network infrastructure. If the command is received at the peer processor of the first storage processor system and the peer processor of the first storage processor system is determined to not be the correct destination processor, then the command is passed to the peer processor of the second storage processor system. Further, executable code may transmit a data packet generated at a source processor via the network infrastructure and at least one of the first storage processor system and the second storage processor system to the client device.

According further to the system described herein, a system for communicating with multiple storage processors includes a first storage processor system and a second storage processor system, wherein each of the first storage processor system and the second storage processor system include a first processor and a peer processor. A client device is coupled to the first storage processor system and the second storage processor system, wherein a port of the client device is connected to a port of at least one of the first processor and the peer processor of the first storage processor system, and wherein the port of the at least one of the first processor and the peer processor of the first storage processor system may be connected to a port of at least one of the first processor and the peer processor of the second storage processor system. Each of the first processor and the peer processor of each of the first storage processor system and the second storage processor system may have a static IP address. A first port of the client device may be directly connected to the first processor of the first storage processor system and a second port of the client device may be directly connected to the peer processor of the first storage processor system.

A port of the first processor of the first storage processor system may be directly connected to a port of the first processor of the second storage processor system. The first processor of the first storage processor system may assess a command received from the client device and, if the first processor of the first storage processor system determines that the first processor is not a correct destination processor to process the command, may pass the command to the first processor of the second storage processor system. A port of the peer processor of the first storage processor system may be directly connected to a port of the peer processor of the second storage processor system. The peer processor of the first storage processor system may assess a command received from the client device and, if the peer processor of the first storage processor system determines that the peer processor is not a correct destination processor to process the command, my pass the command to the peer processor of the second storage processor system.

At least one additional storage processor system may be coupled to the second storage processor system. A port of the first processor of the second storage processor system may be directly connected to a port of the first processor of the at least one addition storage processor system. The first processor of the second storage processor system may assess a command received from the client device and, if the first processor of the second storage processor system determines that the first processor is not a correct destination processor to process the command, passes the command to the first processor of the at least one additional storage processor system. A port of the peer processor of the second storage processor system may be directly connected to a port of the peer processor of the at least one additional storage processor system. The peer processor of the second storage processor system may assess a command received from the client device and, if the peer processor of the second storage processor system determines that the peer processor is not a correct destination processor to process the command, may pass the command to the peer processor of the at least one additional storage processor system.

According further to the system described herein, a method for communicating with multiple storage systems includes receiving a command from a client device at a first storage processor system that is connected to a second storage processor system, wherein each of the first and second storage processor systems includes a first processor and a peer processor. The command is assessed in connection with a particular one of the first processor and the peer processor of the first storage processor system. If the particular one of the first processor and the peer processor of the first storage processor system is determined to be a correct destination processor to process the command, then the command is processed. If the particular one of the first processor and the peer processor of the first storage processor system is determined to not be the correct destination processor to process the command, then the command is passed to a different processor. The different processor may be at least one of: the other of the first processor and the peer processor of the first storage processor system, the first processor of the second storage processor system, and the peer processor of the second storage processor system. A first port of the client device may be directly connected to the first processor of the first storage processor system and a second port of the client device is directly connected to the peer processor of the first storage processor system.

According further to the method, a port of the first processor of the first storage processor system may be directly connected to a port of the first processor of the second storage processor system, and wherein a port of the peer processor of the first storage processor system may be directly connected to a port of the peer processor of the second storage processor system. If the command is received at the first processor of the first storage processor system and the first processor of the first storage processor system is determined to not be the correct destination processor, then the command may be passed to the first processor of the second storage processor system. If the command is received at the peer processor of the first storage processor system and the peer processor of the first storage processor system is determined to not be the correct destination processor then the command may be passed to the peer processor of the second storage processor system. Further, a data packet generated at a source processor via at least one of the first storage processor system and the second storage processor system may be transmitted to the client device.

The command may be received at an additional storage processor system coupled to the second storage processor system, wherein the at least one additional storage processor system includes a first processor and a peer processor. If the command is received at the first processor of the second storage processor system and the first processor of the second storage processor system is determined to not be the correct destination processor, then the command may be passed to the first processor of the at least one additional storage processor system. If the command is received at the peer processor of the second storage processor system and the peer processor of the second storage processor system is determined to not be the correct destination processor then the command is passed to the peer processor of the at least one additional storage processor system.

According further to the system described herein, a computer program product, stored on a computer-readable medium, for communicating with multiple storage processor systems. The computer program product may include executable code that receives a command at a first storage processor system that is connected to a second storage processor system, wherein each of the first storage processor system and the second storage processor system includes a first processor and a peer processor. Executable code may determine if a particular one of the first processor and the peer processor of the first storage processor system is a correct destination processor to process the command. Executable code may pass the command to a different processor if the particular one of the first processor and the peer processor of the first storage processor system is not the correct destination processor to process the command. The different processor may be at least one of: the other of the first processor and the peer processor of the first storage device, the first processor of the second storage device, and the peer processor of the second storage device. The command may be received at the first storage processor system via a direct connection from a client device, and wherein the command is transmitted via a direct connection from the particular one of the first processor and the peer processor of the first storage processor system to the different processor.

BRIEF DESCRIPTION OF THE DRAWINGS

Embodiments of the system are described with reference to the several figures of the drawings, described as follows.

DETAILED DESCRIPTION OF VARIOUS EMBODIMENTS

Referring now to the figures of the drawings, the figures comprise a part of this specification and illustrate exemplary embodiments of the described system. It is to be understood that in some instances various aspects of the system may be shown schematically or may be shown exaggerated or altered to facilitate an understanding of the system.

Figure 1:
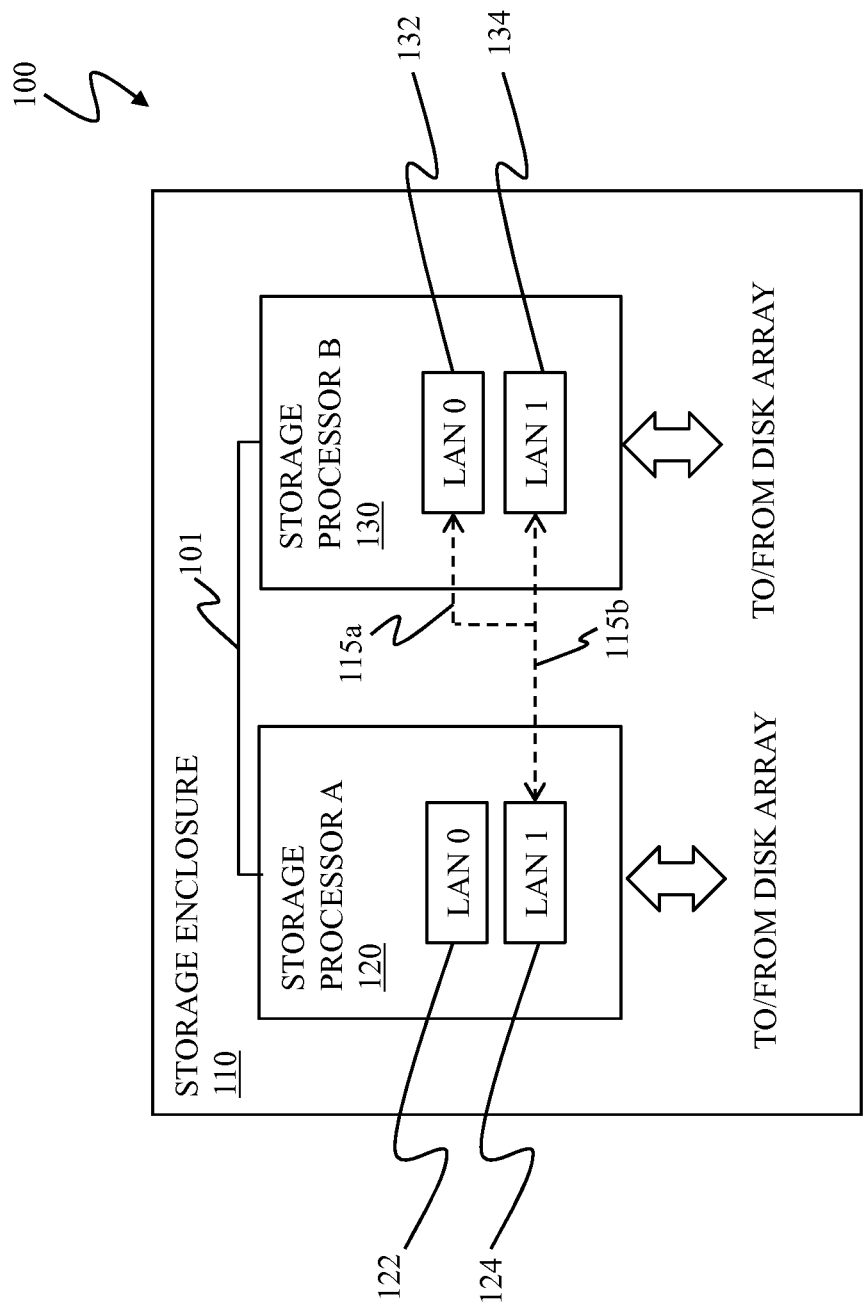
FIG. 1 is a schematic illustration of a storage system including a storage enclosure and two peer storage processors, storage processor-A (SPA) and storage processor-B (SPB) contained within the storage enclosure, according to an embodiment of the system described herein.

FIG. 1 is a schematic illustration of a storage system 100 including a storage enclosure 110 and two peer storage processors (storage processor boards): storage processor A (SPA) 120 and storage processor B (SPB) 130. According to an embodiment of the system described herein, storage processor A 120 and storage processor B 130 may be contained within the storage enclosure 110 and may be coupled to one or more disk arrays (not shown in FIG. 1) or similar storage devices controlled by one or more of the storage processors 120, 130. The storage processors 120, 130 may be internally connected together within the storage enclosure 110 via a path 101 allowing data exchange and other information exchange during operation of the storage system 100.

Each of the storage processors 120, 130 may include one or more ports, for example, two Ethernet ports that communicate using tcp/ip. The storage processor 120 may have a LAN0 port 122 and a LAN1 port 124 while the storage processor 130 may have a LAN0 port 132 and a LAN1 port 134. The ports may be used for servicing and/or maintenance of the storage processors 120, 130 and/or the storage system 100 and for connecting multiple storage systems, as further discussed elsewhere herein. It is also possible to connect the LAN ports between the SPA 120 and SPB 130 with connections that are shown as dotted lines between the LAN1 port 124 on the SPA 120 and the LAN0 port 132 (connection 115a) and/or the LAN1 port 134 (connection 115b) on the SPB 130. In various embodiments, the connections 115a, 115b and/or other connections described herein between multiple storage systems, including, for example, direct connections between storage systems and/or connections to a network, may include cross-over Ethernet cables and/or may utilize auto-sensing capabilities of the LAN ports with any suitable cable and/or may use network infrastructure as a communication path, as further described elsewhere herein.

The LAN1 port 124 on the SPA 120 may have a static Internet protocol (IP) address assigned thereto that is different from another static IP address assigned to the LAN1 port 134 on the SPB 130. Alternatively, the ports may obtain a dynamic IP address using, for example, DHCP. It should be noted that although the illustrated embodiment shows two ports on each processor that may be used as service and/or management ports, various embodiments of the system described herein may operate with other numbers of ports on each processor.

In various embodiments, the system described herein may operate with storage systems produced by EMC Corporation of Hopkinton, Mass., including, for example, CLARiiON® storage systems, such as the CX3 series, and Remote Data Facility (RDF) storage systems. Other appropriate storage systems may also be used.

Figure 2:
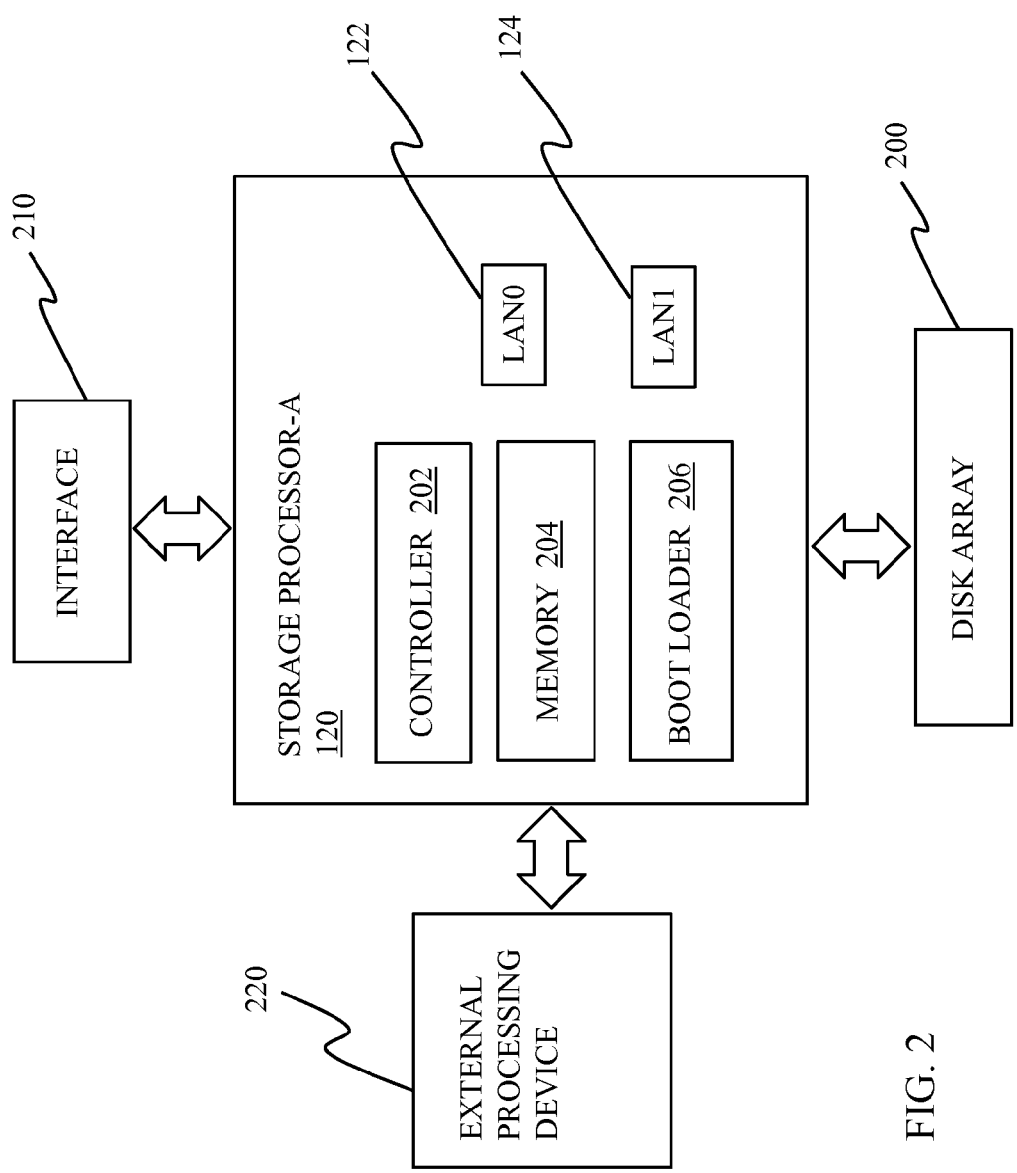
FIG. 2 is a schematic illustration of a configuration of the SPA according to an embodiment of the system described herein.

FIG. 2 is a schematic illustration of the SPA 120 according to an embodiment of the system described herein. The SPA 120 may include a controller module 202, a memory 204, and a boot loader system 206, among other components. The controller module 202, memory 204 and the boot loader system 206 may be coupled together as separate modules and/or may incorporated into one module. In various embodiments, the controller module 202 may include a central processing unit (CPU) motherboard with one or more microprocessors, e.g., Intel processors, that control operations of the SPA 120, including accessing the memory 204, e.g., volatile memory, which may include random access memory (RAM), flash memory and/or other suitable memory. In an embodiment, the memory 204 may be greater than or equal to five hundred twelve Mb of memory. The boot loader system 206, such as a basic input/output system (BIOS), may be included as part of firmware code, embedded on a computer read-only memory (ROM), included in flash memory and/or included as part of some other software or hardware system that allows the storage processor to obtain and process a boot image and/or other boot information for booting.

The SPA 120 may be coupled to a disk array 200, which represents any appropriate storage systems/devices. The disk array 200 may be contained within the storage enclosure 110 and/or disposed externally to the storage enclosure 110. The SPA 120 may also be coupled to a user interface 210, including one or more software programs such as Navisphere® products, for example, produced by EMC Corporation of Hopkinton, Mass., that allows management of the storage processors 120, 130 and/or the entire storage system 100. The interface 210 may also include hardware and/or software products accessible via a network, such as an intranet and/or the Internet. The SPA 120 may include one or more network interface cards (NICs). The SPA 120 may also be powered by a power supply (not shown) and may include ports for coupling to the power supply.

The SPA 120 may be coupled to an external processing device 220 that may include one or more servers, as discussed herein. The external processing device 220 may include a dynamic host configuration protocol (DHCP) server that may supply an IP address when requested and may also include a boot server with memory containing a boot image and/or other boot files that may be download to the storage processor as part of a boot process. The DHCP server may be the same server as or different server from the boot server. The external processing device 220 may be incorporated as part of the SPA 120 and/or may be located separately from, and accessed by, the SPA 120. For example, the external processing device 220 may be accessed by the SPA 120 using a network, such as an intranet and/or the Internet. Alternatively, for example, the SPA 120 may include the boot server incorporated therein and the DHCP server may be coupled to, but located separately from, the SPA 120.

Figure 3:
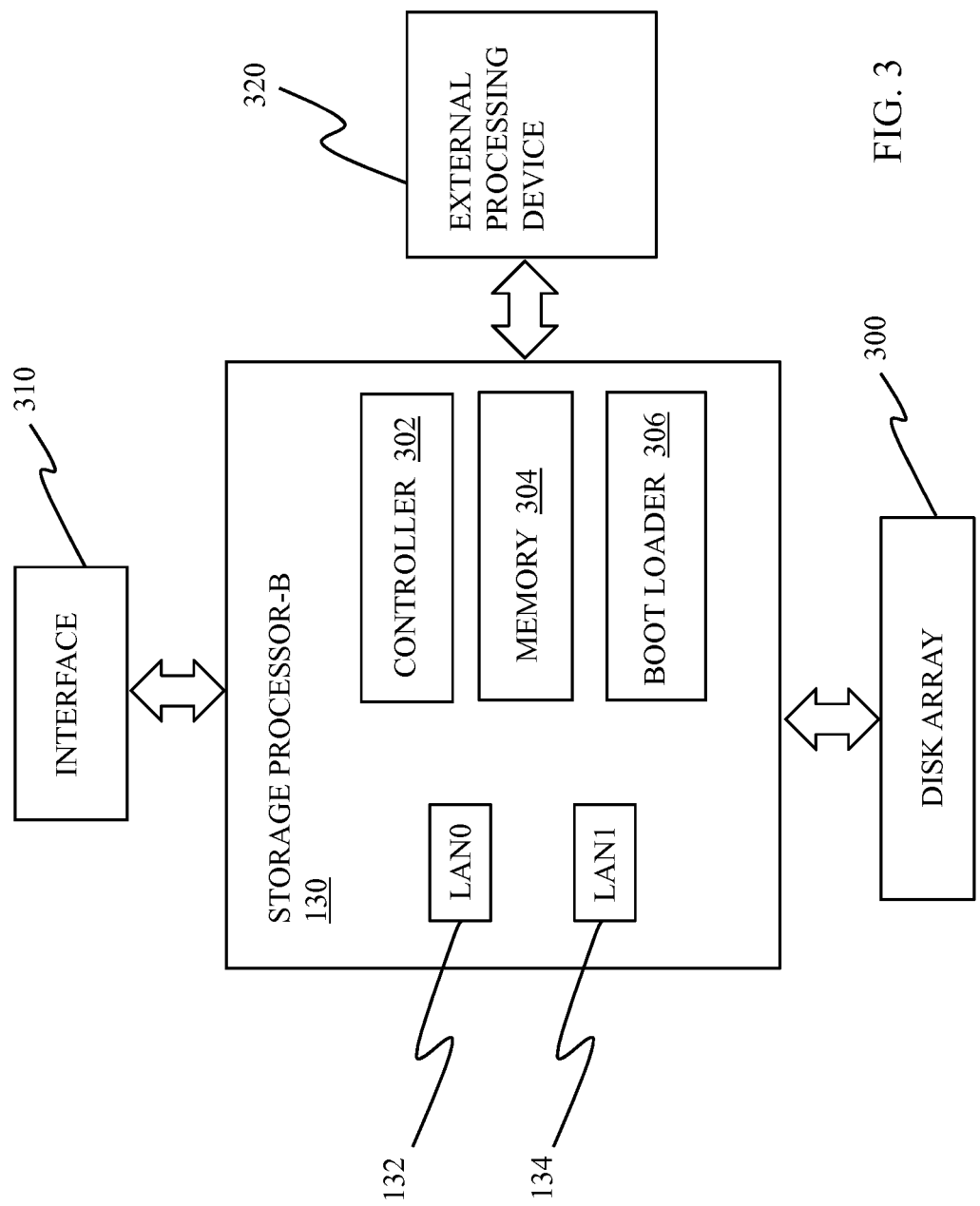
FIG. 3 is a schematic illustration of a configuration of the SPB according to an embodiment of the system described herein.

FIG. 3 is a schematic illustration of a configuration of the SPB 130 according to an embodiment of the system described herein. The SPB 130 may be similarly configured with similar components and couplings as described herein with respect to the SPA 120. The SPB 130 may include a controller 302, a memory 304, and a boot loader 306. The SPB 130 may be coupled to an interface 310 and an external processing device 320. As further discussed elsewhere herein, the external processing device 320 may be separate from the SPB 130 or incorporated as part of the SPB 130. If separate from the SPB 130, it is possible that the external processing device 220 and the external processing device 320 may be the same device. Similarly, the interface 210 and the interface 310 may be the same interface. The SPB 130 may be coupled to a disk array 300 (representing any appropriate storage systems/devices) contained within the storage enclosure 110 and/or disposed externally to the storage enclosure 110. Note that the disk array 300 coupled to the SPB 130 may be the same as or different from the disk array 200 coupled to the SPA 120.

Figure 4:
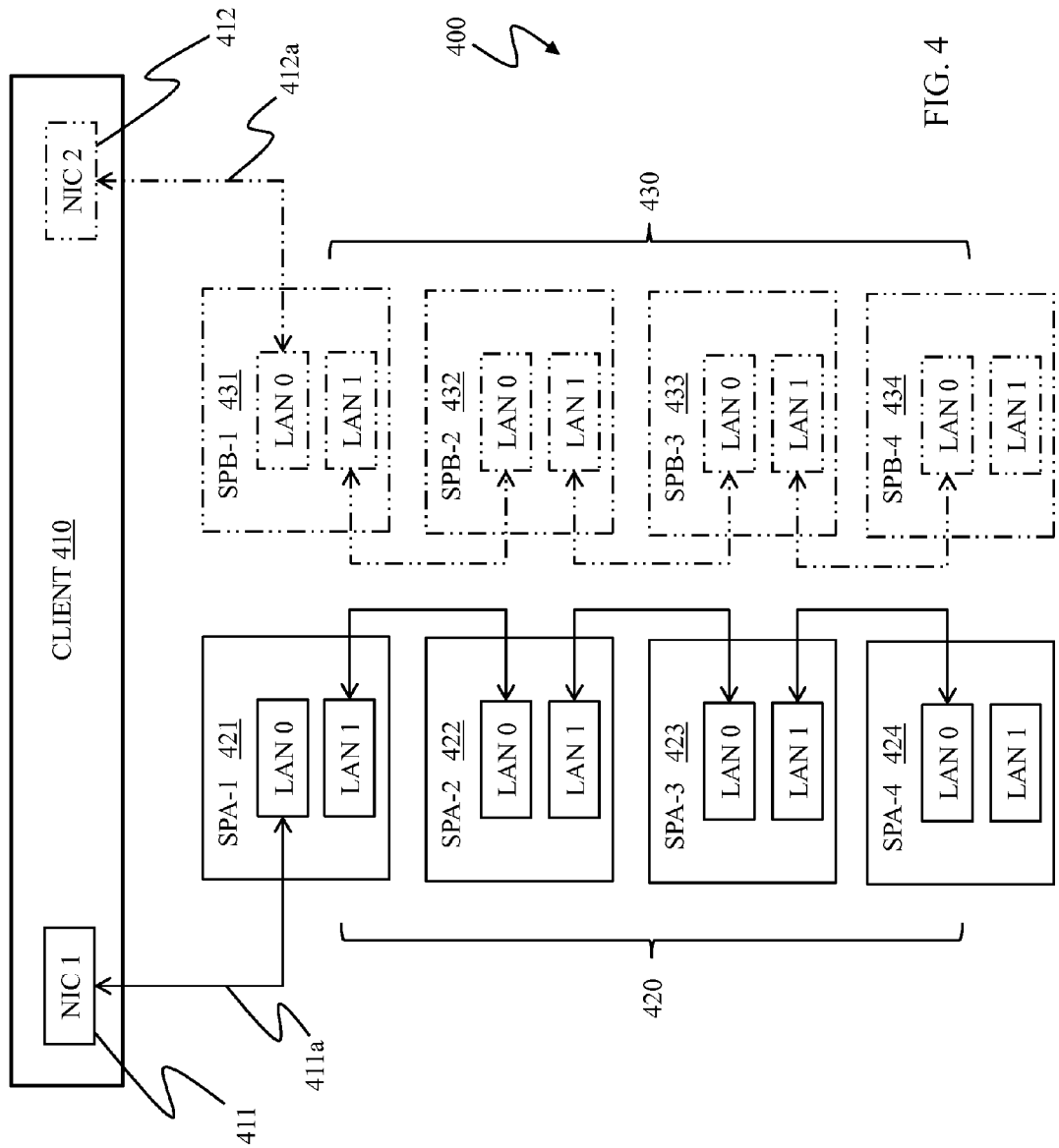
FIG. 4 is a schematic illustration of a system including four storage processors pairs according to an embodiment of the system described herein.

FIG. 4 is a schematic illustration of a testing system 400 for testing four storage processors pairs: SPA-1 421 and SPB-1 431; SPA-2 422 and SPB-2 432; SPA-3 423 and SPB-3 433; and SPA-4 424 and SPB-4 434, according to an embodiment of the system described herein. It should be noted that the system described herein may operate with a numbers of processor pairs other than that illustrated, including three or fewer processor pairs and/or five or more processor pairs. The system 400 may include a client testing device 410, such as a PC or laptop computer, having two Ethernet ports, such as NIC ports NIC-1 411 and NIC-2 412, for connecting with the storage processors via connections 411a, 412a that may be direct cable connections and/or connections via a network, as described elsewhere herein. As illustrated, the port NIC-1 411 is connected to the first SPA 421 in a chain of SPA processors and the port NIC-2 412 is connected to the first SPB 431 in a chain of SPB processors. For purposes of explanation and illustration, the devices, LAN ports and data connections associated with SPA processors are illustrated with a solid line and the devices, LAN ports and data connections associated with SPB processors are illustrated with a broken line. Each of the four storage processors pairs 421-424, 431-434 may be tested as standalone devices and/or may be tested while contained in storage enclosures of separate storage systems. The storage enclosures may be located in physically proximity to each other and directly connected via cables, such as described elsewhere herein, and/or may be located physically distant from one another and connected using a network, such as an intranet or the Internet.

The SPA processors 421-424 may be connected together via a series of connections 420 among the SPA storage processors 421-424. For example, the LAN1 port of the SPA-1 421 may be connected to the LAN0 port of the SPA-2 422, the LAN1 port of the SPA-2 422 may be connected to the LAN0 port of the SPA-3 423, and the LAN1 port of the SPA-3 423 may be connected to the LAN0 port of the SPA-4 424. The SPB processors 431-434 may be connected together via a series of connections 430 among the SPB storage processors 4231-434, similar to the SPA storage processors 421-424. That is, the LAN1 port of the SPB-1 431 may be connected to the LAN0 port of the SPB-2 432, the LAN1 port of the SPB-2 432 may be connected to the LAN0 port of the SPB-3 433, and the LAN1 port of the SPB-3 433 may be connected to the LAN0 port of the SPB-4 434.

In an embodiment, the system 400 may operate under the following conditions: (1) LAN0, LAN1, NIC1 and NIC2 all have unique static IP addresses; and (2) the LAN0, LAN1, NIC1 and NIC2 are all on the same subnet. For example, all LAN0 ports may have static IP addresses of 192.168.1.1 and all LAN1 ports may have static IP addresses of 192.168.1.2. NIC1 and NIC2 on the client device 410 may have IP addresses of 192.168.1.201 and 192.168.1.202, respectively.

When the client device 410 sends out commands to one of the connected storage processors (SPs), e.g., SPA-1 421 or SPB-1 431, the command may be processor by the first connected SP. The first connected SP looks at the command and processes the command only if the command is for that SP. Otherwise, the first SP passes the command to the next connected SP through its LAN1 port, e.g., SPA-2 422 or SPB-2 432. In this way, the command will eventually reach the appropriate destination SP and get processed. This is also true for data originating from an SP. The data packets may be routed through all the SPs that are connected between the source SP and the client device 410 to reach the client device 410 eventually.

It should be noted that in the illustrated embodiment, the client device 410 determines beforehand whether a command is for an SPA processor or an SPB processor. If the command is for an SPA processor, then the client device 410 sends the command to the first connected SPA processor, SPA-1 421, from the NIC-1 port 411 of the client device 410. If the command is for an SPB processor, then the client device 410 sends the command to the first connected SPB processor, SPB-1 431, from the NIC-2 port 412 of the client device 410.

The system described herein gives the storage unit under test the ability to expand with a reduced number of required Ethernet ports on the client device, and with a reduced number of physical connections on the client testing device 410. The system described herein further reduces the cost that would be required of adding additional Ethernet ports on the client testing device 410 and/or adding additional client testing devices.

Figure 5:
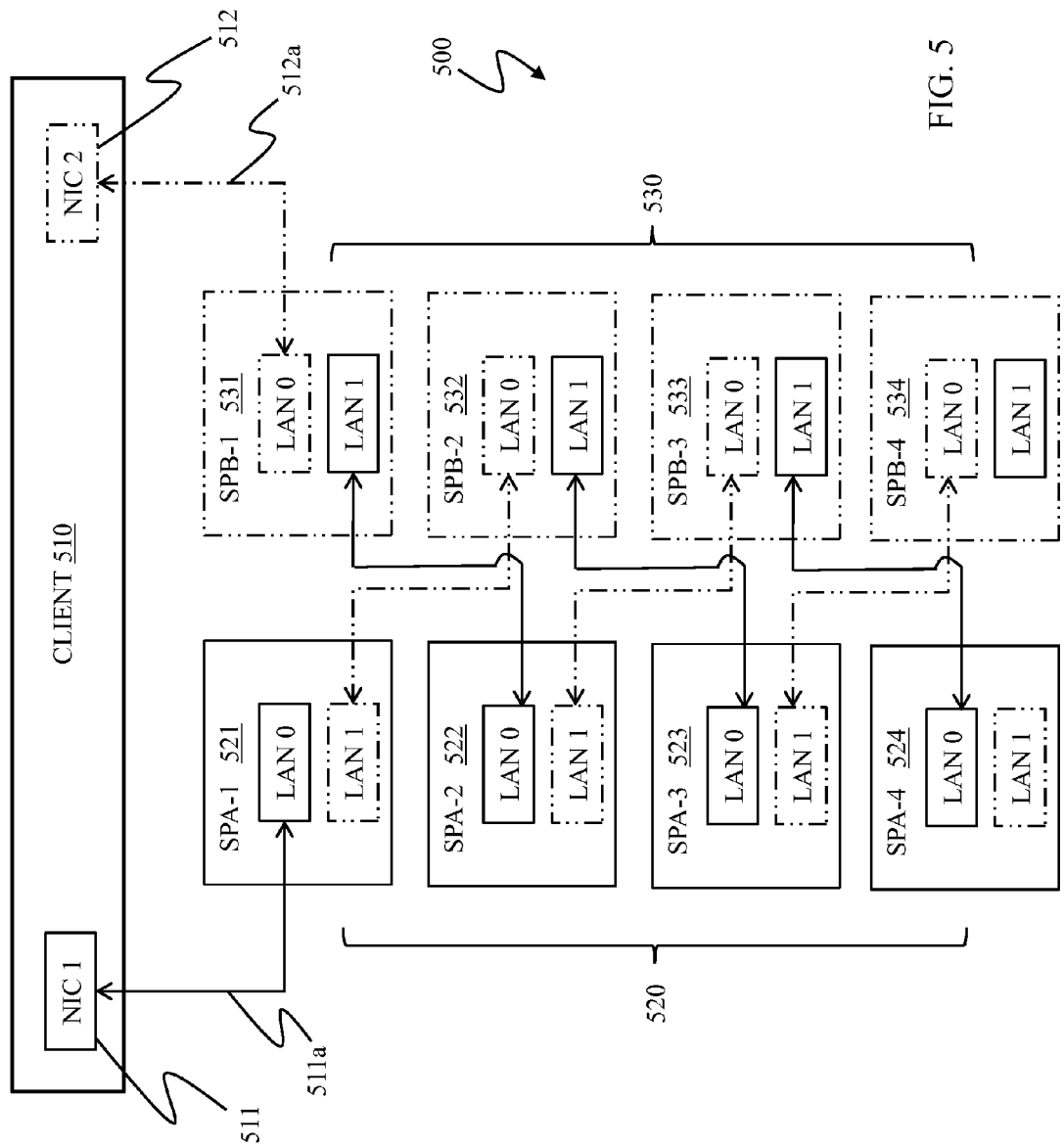
FIG. 5 is a schematic illustration of system including four storage processors pairs according to another embodiment of the system described herein.

FIG. 5 is a schematic illustration of a testing system 500 including four storage processors pairs: SPA-1 521 and SPB-1 531; SPA-2 522 and SPB-2 532; SPA-3 523 and SPB-3 533; and SPA-4 524 and SPB-4 534, according to another embodiment of the system described herein. The system 500 may include a client testing device 510, such as a PC or laptop computer, having two Ethernet ports, such as NIC ports NIC-1 511 and NIC-2 512, for connecting with the storage processors via connections 511a, 512a that may be direct cable connections and/or connections via a network, as described elsewhere herein. The system 500 may operate similarly to the system 400 described herein, with connections 520 and 530, except that, as illustrated, the LAN1 ports on each of the storage processor pairs may be operationally switched within each pair. That is, a LAN1 port on an SPA processor may function as the LAN1 port for the peer SPB processor, and vice versa. This may occur as a result of default configurations of a build-in Ethernet switch existing in a management module of the system, such as the AKULA management module, for example. For purposes of explanation and illustration, the devices, LAN ports and data connections associated with SPA processors are illustrated with a solid line and the devices, LAN ports and data connections associated with SPB processors are illustrated with a broken line.

Figure 6:
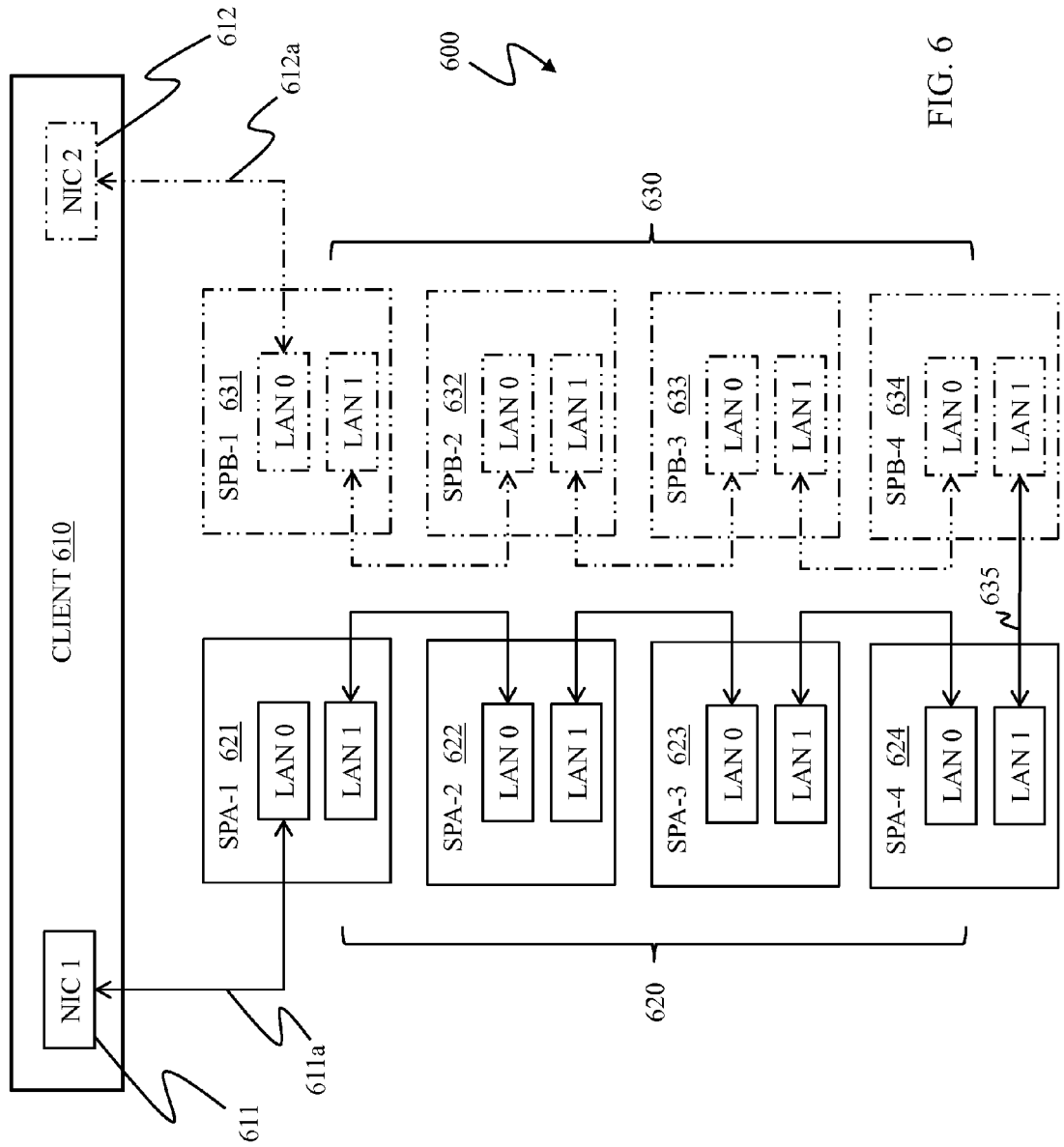
FIG. 6 is a schematic illustration of a system including four storage processors pairs according to another embodiment of the system described herein.

FIG. 6 is a schematic illustration of a testing system 600 including four storage processors pairs: SPA-1 621 and SPB-1 631; SPA-2 622 and SPB-2 632; SPA-3 623 and SPB-3 633; and SPA-4 624 and SPB-4 634, according to another embodiment of the system described herein. The system 600 may include a client testing device 610, such as a PC or laptop computer, having two Ethernet ports, such as NIC ports NIC-1 611 and NIC-2 612, for connecting with the storage processors via connections 611a, 612b that may be direct cable connections and/or connections via a network, as described elsewhere herein. The system 600 may be configured similarly to the system 400 described herein, except that, in the illustrated embodiment of the system 600, the LAN1 ports of the SPA-4 624 and the SPB-4 634 are shown connected by a connection 635. Accordingly, it may be possible to send a command for either an SPA processor and/or an SPB processor from either of the NIC ports 611, 612 of the client device 610. In this case, for example, a command for an SPB processor that is sent from the NIC-1 port 611, may traverse the SPA processors using connections 620 to SPA-4 624 and then be transmitted from the LAN1 port of the SPA-4 624 to the LAN1 port of the SPB-4 634 over the connection 635 and traverse the SPB processors from SPB-4 634 to SPB-1 631 using connections 630, as needed. Alternatively, it may be possible to transmit the command from the SPA-4 624 processor to its peer SPB-4 634 processor using a connection other than the LAN1 connection 635 that is illustrated. Further, other of the SP pairs may be connected like that described with respect to SPA-4 and SPB-4.

Figure 7:
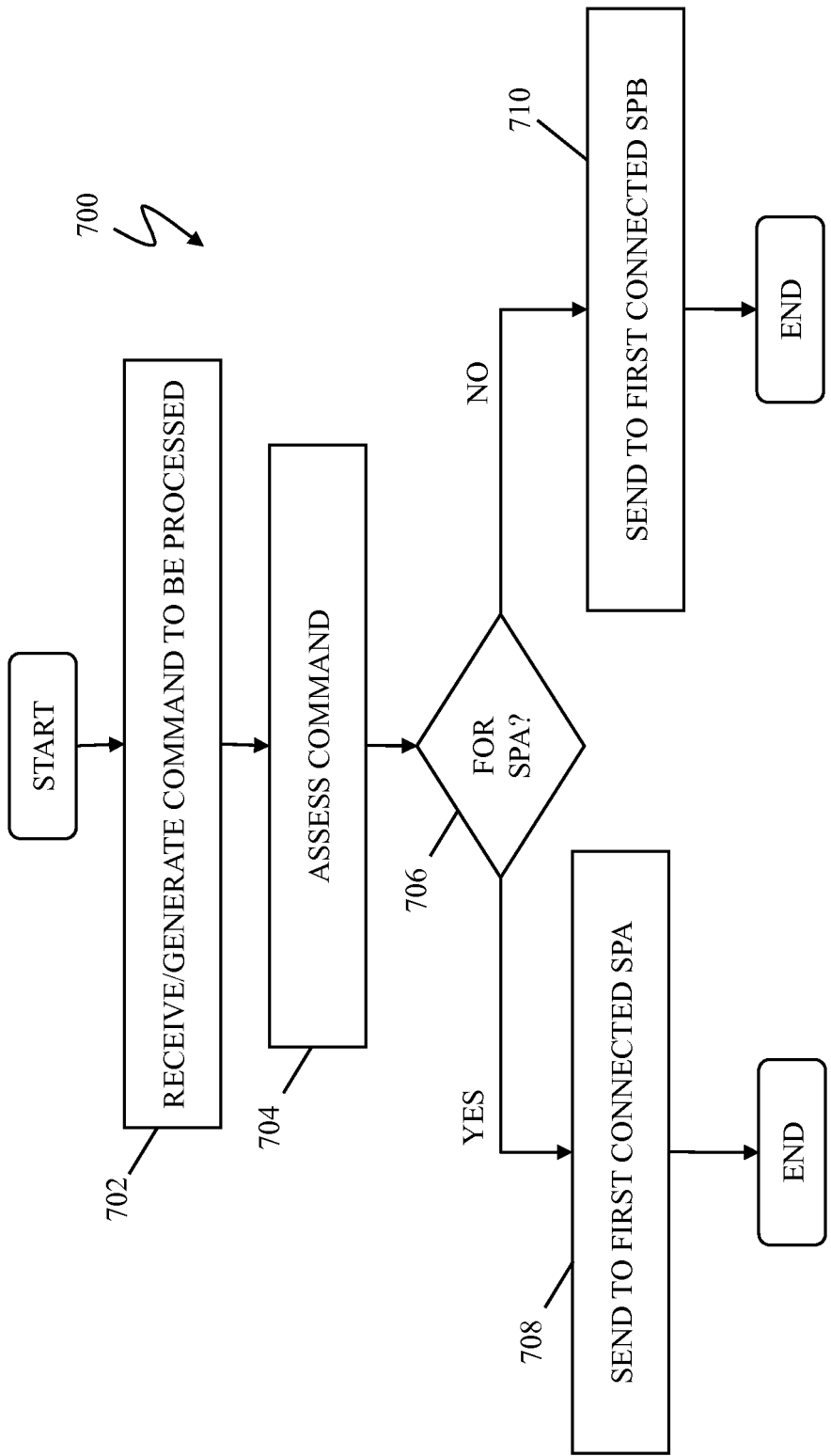
FIG. 7 is a flow diagram showing processing and transmission of a command for a storage processor at a client device according to an embodiment of the system described herein.

FIG. 7 is a flow diagram 700 showing processing and transmission by a client testing device of a command for a storage processor according to an embodiment of the system described herein. At a step 702, the client testing device receives and/or generates a command to be processed on a storage processor on a network coupled to the client device. After the step 702, processing proceeds to a step 704 where the command is assessed by the client device. After the step 704, processing proceeds to a test step 706 where it is determined if the command is for an SPA. If so, then processing proceeds to a step 708 where the client device sends the command to the first connected SPA, for example, using the NIC-1 port of the client device. After the step 708, processing is complete. If at the step 708 it is determined that the command is not for an SPA, meaning it is for an SPB, then processing proceeds to a step 710 where the client device sends the command to the first connected SPB, for example, using the NIC-2 port of the client device. After the step 710, processing is complete.

Figure 8:
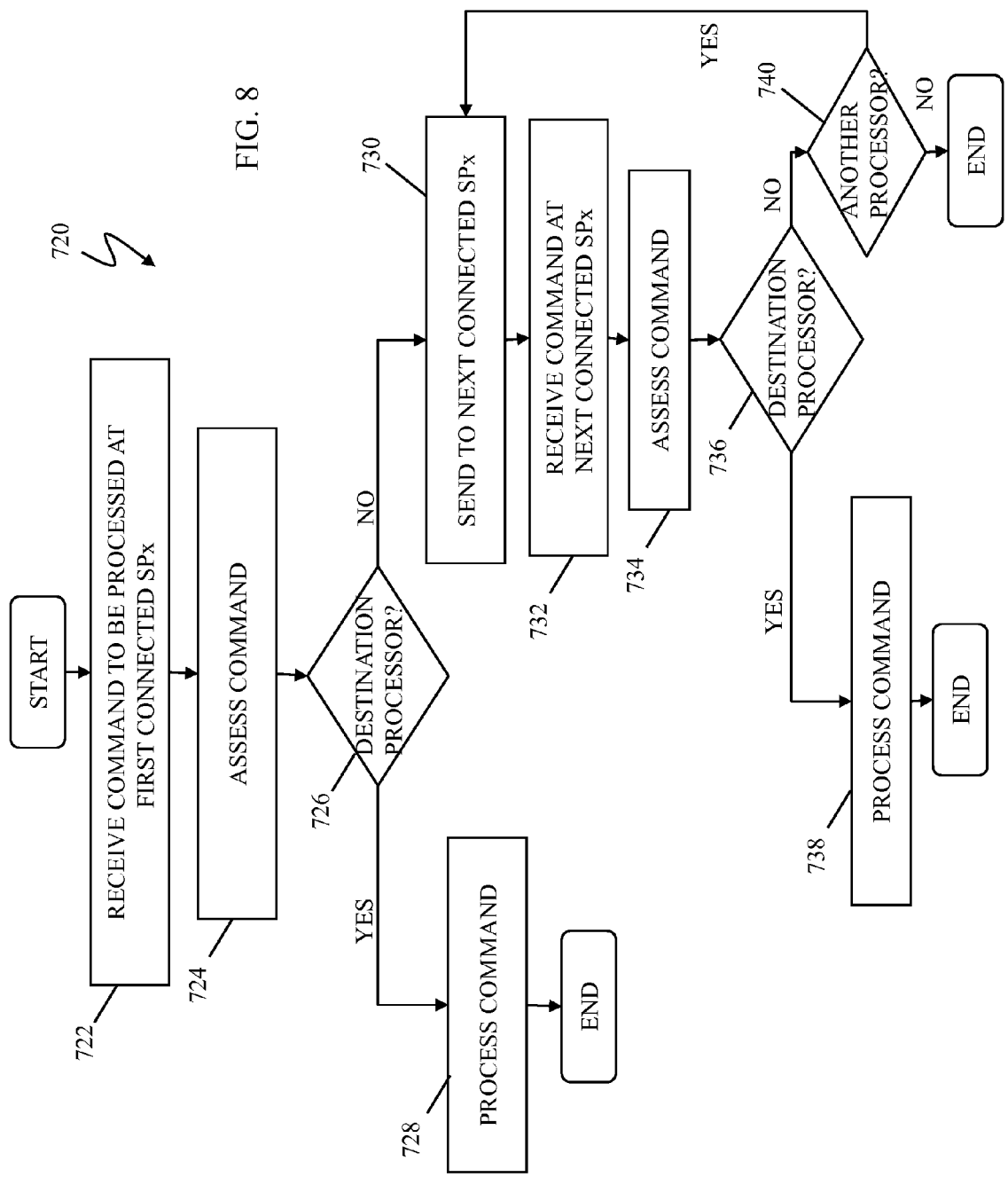
FIG. 8 is a flow diagram showing processing at an SPx chain of processors coupled to the client device according to an embodiment of the system described herein.

FIG. 8 is a flow diagram 720 showing processing at an SPx chain of processors coupled to the client testing device according to an embodiment of the system described herein. The term SPx is meant to represent either SPA or SPB, since the operations of both are similar.

The flow diagram 720 may result from the processing of the step 708 or the step 710 described elsewhere herein in connection with the client testing device. At a step 722, a first connected SPx receives a command to be processed from the client testing device. After the 722, processing proceeds to a step 724 where the first connected SPx assesses the command. After the step 724, processing proceeds to a test step 726 where it is determined if the SPx is the correct destination processor for the command. If so, then processing proceeds to a step 728 where the command is processed by the SPx. After the step 728, processing is complete.

If it is determined at the test step 726 that the SPx is not the correct destination processor for the command, then processing proceeds to a step 730 where the SPx sends the command to the next connected SPx, for example, using a LAN0 port of the SPx to send the command to the LAN1 port of the next connected SPx. After the step 730, processing proceeds to a step 732 where the next connected SPx receives the command. After the step 732, processing proceeds to a step 734 where the next connected SPx assesses the command. After the step 734, processing proceeds to a test step 736 where it is determined if the current SPx is the correct destination processor for the command. If so, then processing proceeds to a step 738 where the command is processed at the current SPx. After the step 738, processing is complete. If at the test step 736, it is determined that the current SPx is not the correct destination processor for the command, then processing proceeds to a test step 740 where it is determined if there is another SPx connected to the current SPx. If so, then processing proceeds back to the step 730 to send the command to the next SPx and perform another iteration. If at the test step 736, it is determined that the current SPx is the correct destination processor for the command, then processing is complete. Note that it is possible that there are no SPx's connected that have the correct destination designation, in which case the command may not be processed and an error message may be returned to the client testing device, transmitted back through the connected SPx's.

Figure 9:
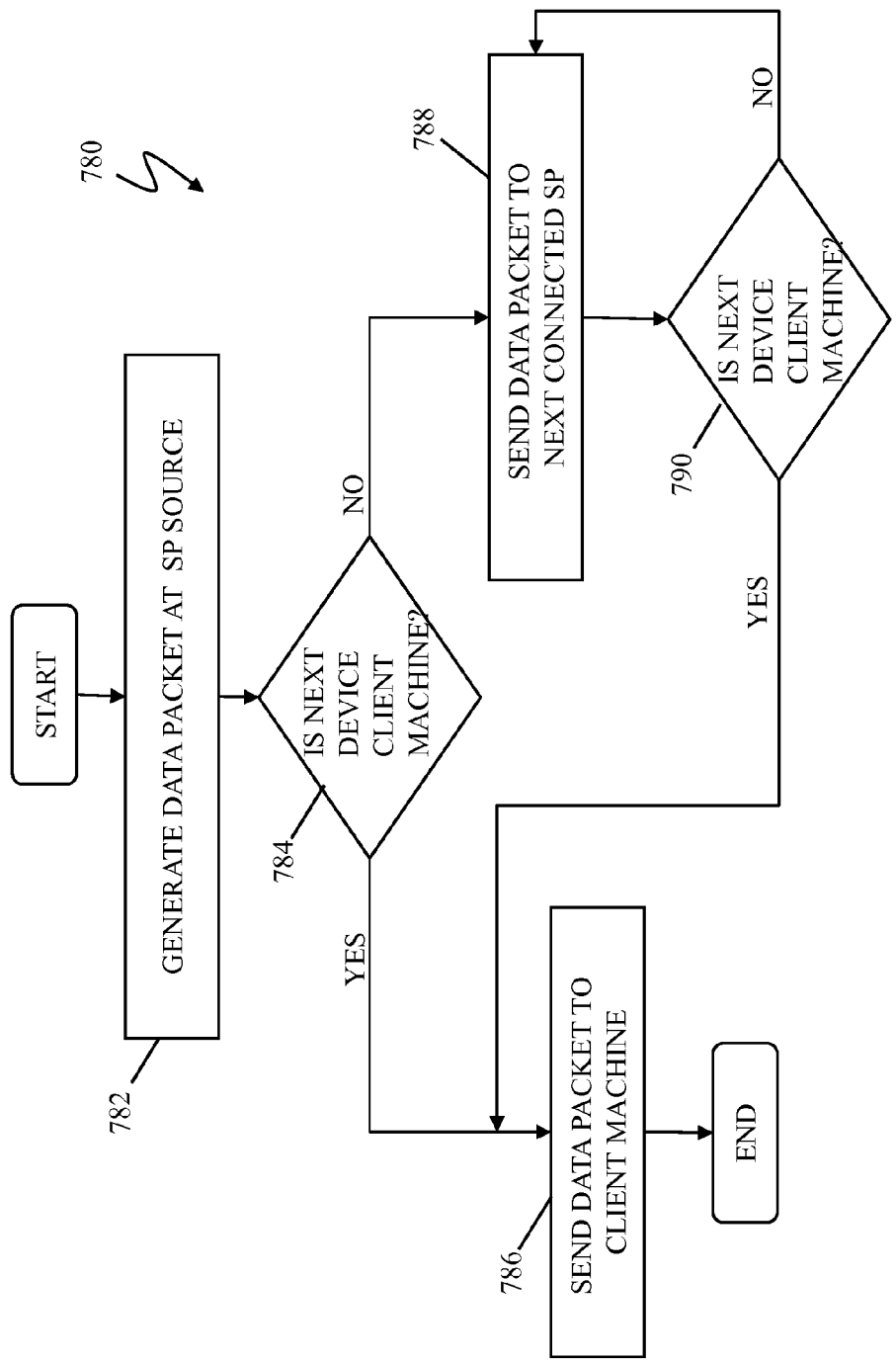
FIG. 9 is a flow diagram showing transmission of a data packet from a source SP to the client device according to an embodiment of the system described herein.

FIG. 9 is a flow diagram 780 showing transmission of a data packet from a source SP to the client device according to an embodiment of the system described herein. At a step 782, a data packet is generated at a source SP. After the step 782, processing proceeds to a test step 784 where it is determined if the next device connected to the SP is the client device. If so, then processing proceeds to a step 786 where the data packet is transmitted from the current SP to the client device. After the step 786, processing is complete. If at the test 784 it is determined that the next device is not the client device, then processing proceeds to a step 788 where the data packet is transmitted to the next connected SP between the source SP and the client device. After the step 788, processing proceeds to a test step 790 where it is determined if the next connected device is the client device. If so, then processing proceeds to the step 786. If not, then processing proceeds back to the step 788.

Figure 10:
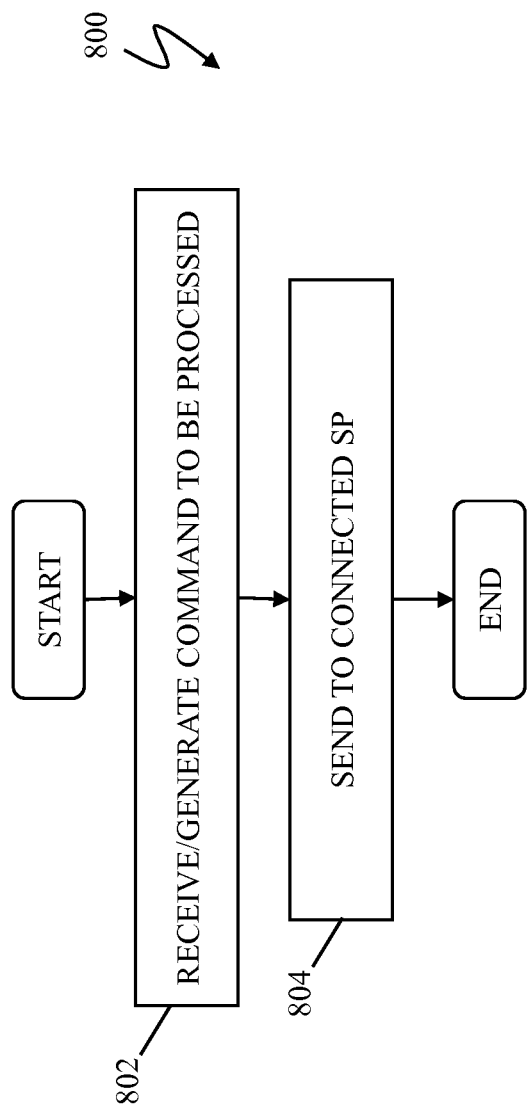
FIG. 10 is a flow diagram showing another embodiment for processing and transmission of a command for a storage processor at a client device according to the system described herein.

FIG. 10 is a flow diagram 800 showing another embodiment for processing and transmission of a command for a storage processor at a client testing device according to the system described herein. At a step 802, the client device receives and/or generates a command to be processed on a storage processor on a network coupled to the client device. After the step 802, processing proceeds to a step 804 where the client device sends the command to the first connected SP, for example, using a Ethernet port such as the NIC-1 port of the client device and/or the NIC-2 port of the client device. After the step 804, processing is complete at the client device. It should be noted that in the embodiment illustrated by the flow diagram 800, the client device is not required to determine if the command is for an SPA or SPB processor. Further, the system described herein may operate with a client device having only one Ethernet port. Other embodiments of the system described herein for a client device using only one Ethernet port are described elsewhere herein.

Figure 11:
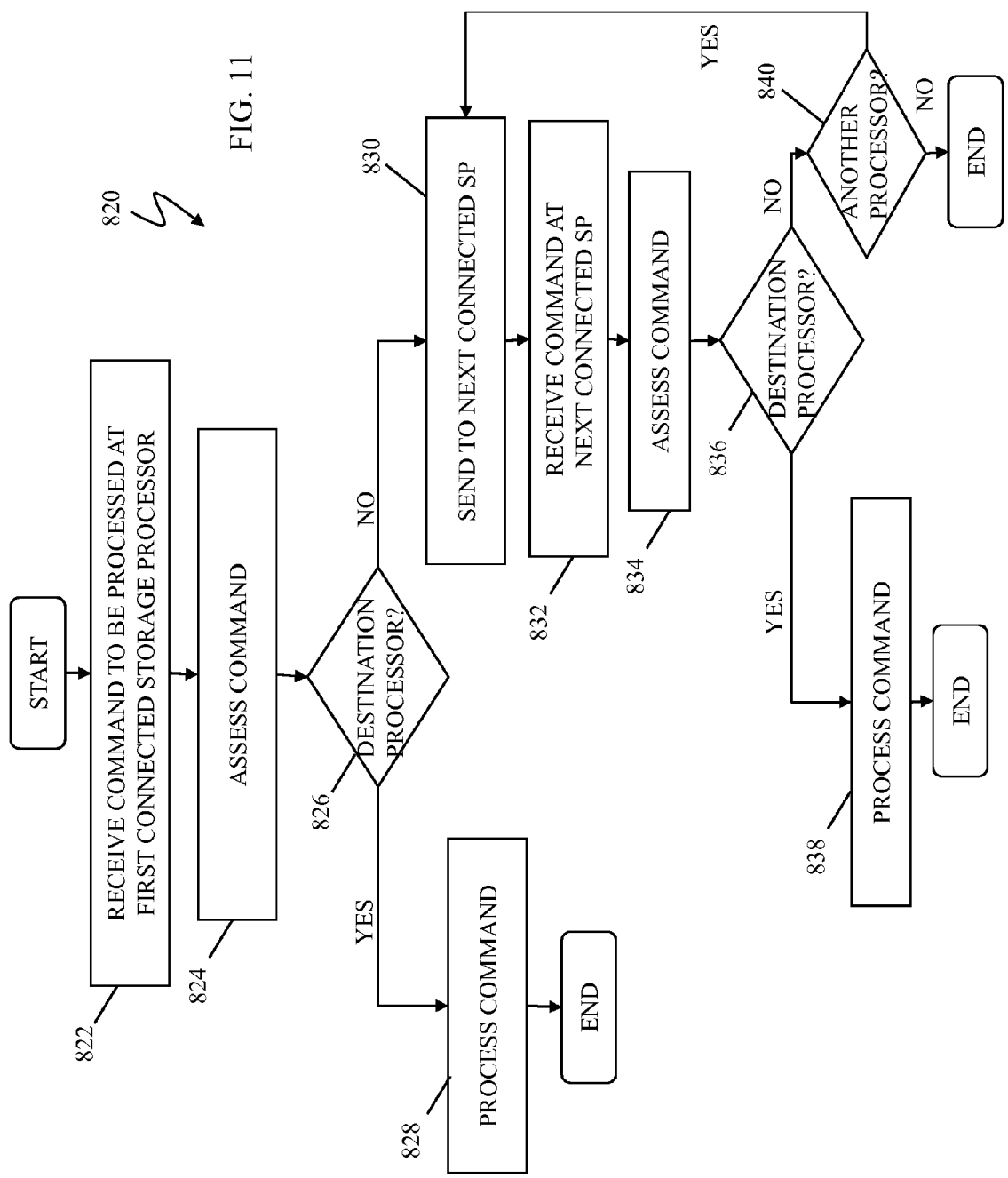
FIG. 11 is a flow diagram showing another embodiment for processing of a command with a chain of SPs, both SPA and SPB, coupled to the client device according to an embodiment of the system described herein.

FIG. 11 is a flow diagram 820 showing another embodiment for processing of a command with a chain of SPs, both SPA and SPB, coupled to the client device according to the system described herein. The flow diagram 820 may result from the processing at the step 804 described elsewhere herein in connection with the client testing device. At a step 822, a first connected SP receives a command to be processed from the client device. The connected SP may be an SPA or an SPB. After the step 822, processing proceeds to a step 824 where the first connected SP assesses the command. After the step 824, processing proceeds to a test step 826 where it is determined if the SP is the correct destination processor for the command. If so, then processing proceeds to a step 828 where the command is processed by the SP. After the step 828, processing is complete.

If it is determined that the SP is the correct destination processor for the command at the test step 826, then processing proceeds to a step 830 where the SP sends the command to the next connected SP, for example, using a LAN0 port of the SP to send the command to the LAN1 port of the next connected SP. In various embodiments, the SP may send the command to a next connected SP of the same type, such as SPA to SPA and/or SPB to SPB. Alternatively, the SP may send the command to a next connected SP of a different type, for example, SPA to SPB and/or SPB to SPA. After the step 830, processing proceeds to a step 832 where the next connected SP receives the command. After the step 832, processing proceeds to a step 834 where the next connected SP assesses the command.

After the step 834, processing proceeds to a test step 836 where it is determined if the current SP is the correct destination processor for the command. If so, then processing proceeds to a step 838 where the command is processed at the current SP. After the step 838, processing is complete. If at the test step 836, it is determined that the current SP is not the correct destination processor for the command, then processing proceeds to a test step 840 where it is determined if there is another next SP connected to the current SP. If so, then processing proceeds back to the step 830. If not, then processing is complete. Alternatively, if there are no further next SPs connected and the command has not been processed, then an error message may be returned to the client device, transmitted back through the connected SPs.

Figure 12:
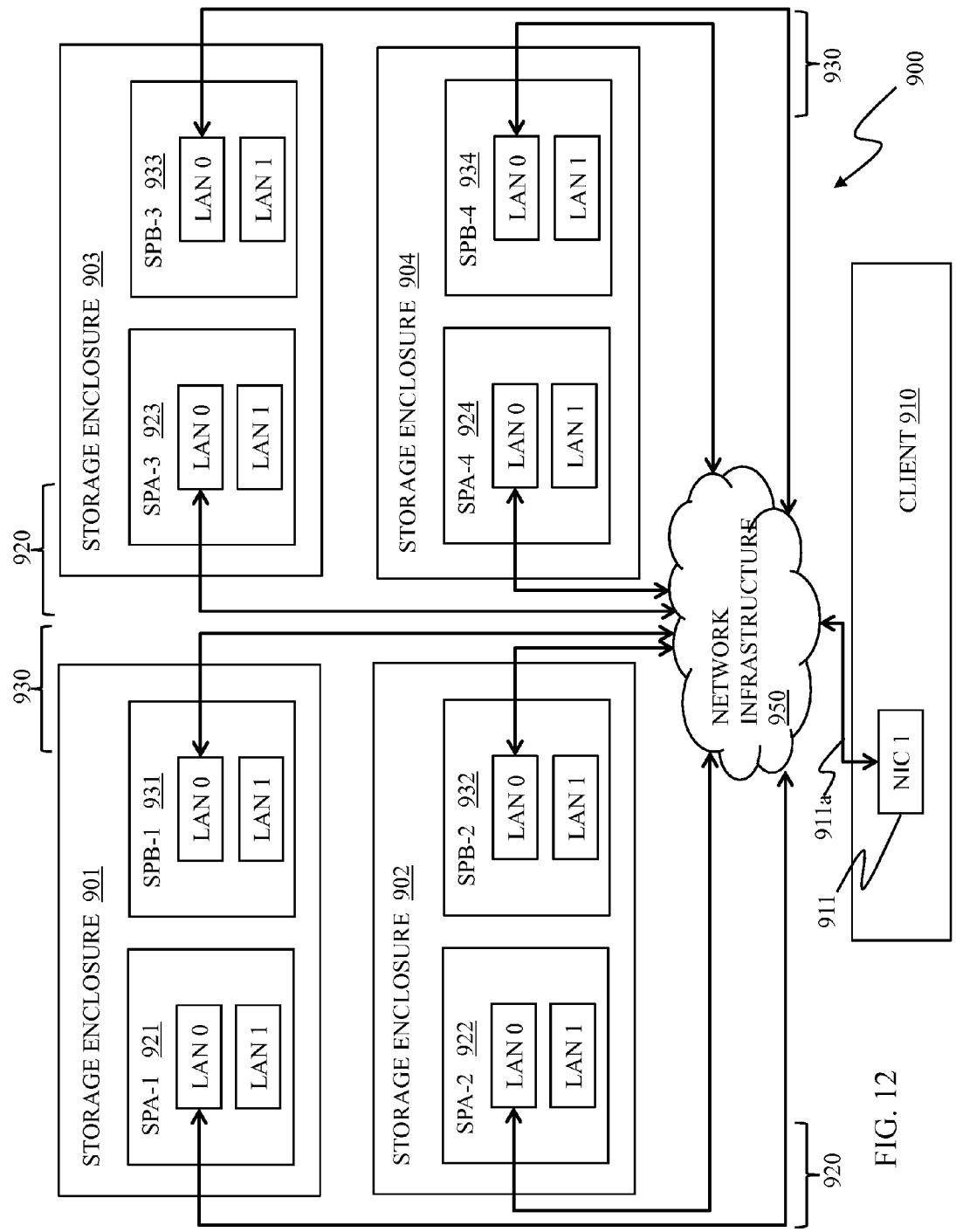
FIG. 12 is a schematic illustration of a storage system with multiple storage enclosures containing multiple SP pairs connected via a network infrastructure to a client device according to an embodiment of the system described herein.

FIG. 12 is a schematic illustration of a storage system 900 with multiple storage enclosures 901-904 containing multiple SP pairs 921-924, 931-934 connected via a network infrastructure 950 to a client device 910 according to an embodiment of the system described herein. The network infrastructure 950 may include local intranet infrastructure and/or Internet infrastructure, and the SPs may have unique IP addresses on the network. The IP addresses may be static IP addresses, which, for example, may be input by a user to the client device to locate the storage systems, and/or may be dynamic IP addressed assigned, for example, by a conventional DHCP server. Other devices may be included for processing signals from the network, including one or more Ethernet switches/hubs/routers and may be disposed within storage enclosures and/or external to storage enclosures. The client device 910 may include an Ethernet port 911. Physical connection of the client device 910 to the network infrastructure 950 is shown as a connection 911a, which may be a cross-over Ethernet cable or other cable (e.g., a straight cable used in conjunction with port auto-sensing) as further described elsewhere herein. As illustrated, each of the SPAs 921-924 and the SPBs 931-934 may include a LAN0 and a LAN1 port and the LAN0 port of each of the SPAs 921-924 and SPBs 931-934 may be connected to the network infrastructure 950. A plurality of connections 920 connect the SPAs to the network infrastructure. A plurality of connections 930 connect the SPBs to the network infrastructure. The connections 920, 930 may be cable and/or other connections as further discussed elsewhere herein. In the illustrated embodiment, the connections between the client device 910, the SPAs 921-924 and the SPBs 931-934 may all be through the network infrastructure according to logical connections, and commands and data packets processed accordingly, as further discussed elsewhere herein.

Figure 13:
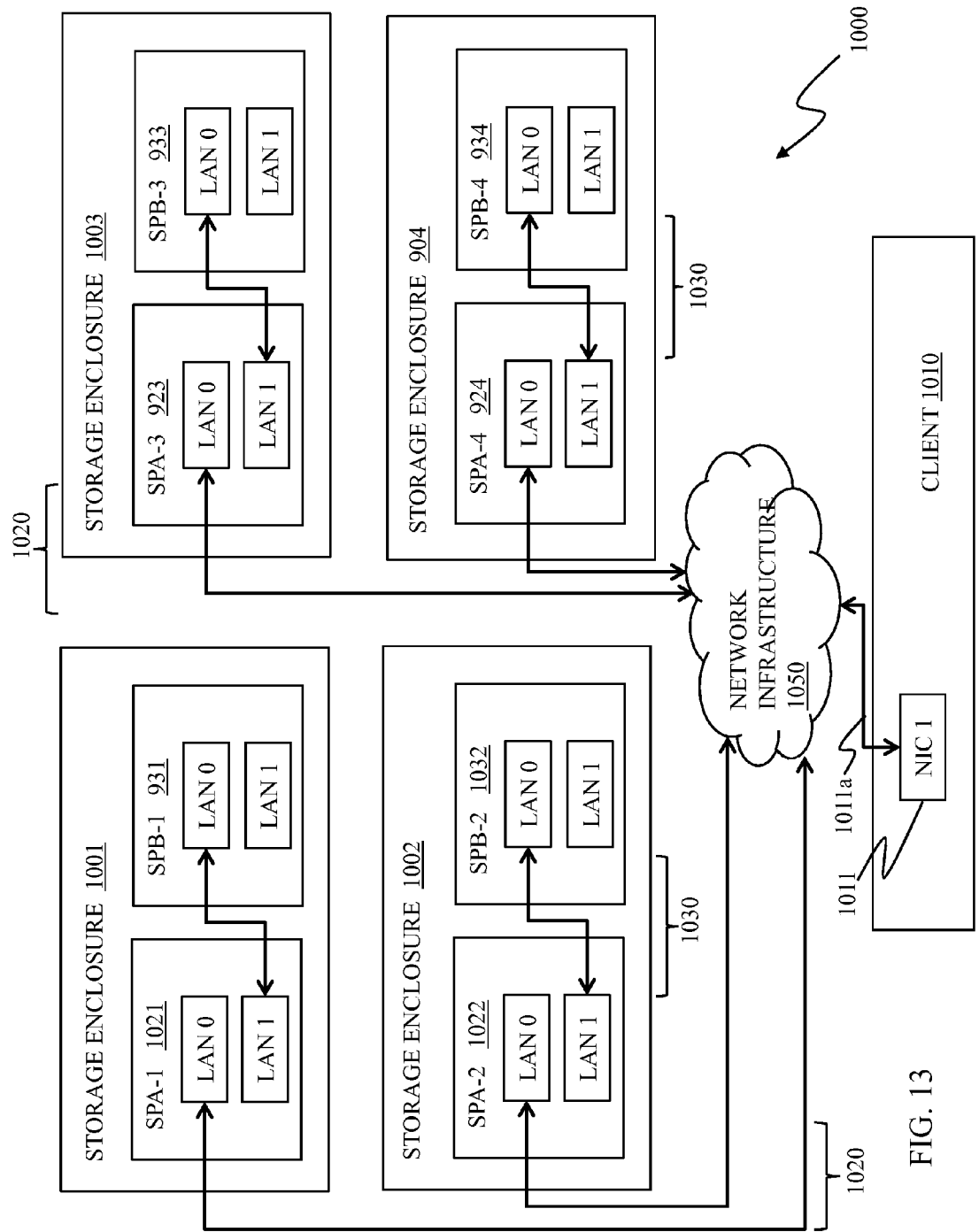
FIG. 13 is a schematic illustration of a storage system with multiple storage enclosures containing multiple storage processor pairs connected to each other and via a network infrastructure to a client device according to another embodiment of the system described herein.

FIG. 13 is a schematic illustration of another embodiment of a storage system 1000 with multiple storage enclosures 1001-1004 containing multiple storage processor pairs 1021-1024, 1031-1034 connected to each other and to a client device 1010 via a network infrastructure 1050 according to the system described herein. The network infrastructure 1050 may include local intranet infrastructure and/or Internet infrastructure, and the SPs may have unique ID addresses on the network. The IP addresses may be static IP addresses which, for example, may be input by a user at the client device. The IP addresses may be dynamic IP addressed assigned, for example by a conventional DHCP server. Other devices may be included for processing signals from the network, including one or more Ethernet switches/hubs/routers that may be disposed within storage enclosures and/or external to storage enclosures. The client device 1010 may include an Ethernet port 1011 that is connected to the network infrastructure 1050 using connection 1011a, which may be a cross-over Ethernet cable or other cable (e.g., a straight connect used in conjunction with auto-sensing port(s)) as further described elsewhere herein). As illustrated, each of the SPAs 1021-1024 and the SPBs 1031-1034 may include a LAN0 and a LAN1 port and the LAN0 port of each of the SPAs 1021-1024 may be connected to the network infrastructure 1050. The connection of the SPAs to the network infrastructure is shown as connections 1020. The LAN1 ports of the SPAs 1021-1024 may be connected to the LAN0 ports of the SPBs 1031-1034, which are shown as connections 1030. Accordingly, in the illustrated embodiments, only the SPAs 1021-1024 are connected to the client device 1010 via the network infrastructure 1050 and the SPBs 1031-1034 are connected directly to the SPAs 1021-1024 with logical connections. Commands and data processed accordingly, as further discussed elsewhere herein.

Figure 14:
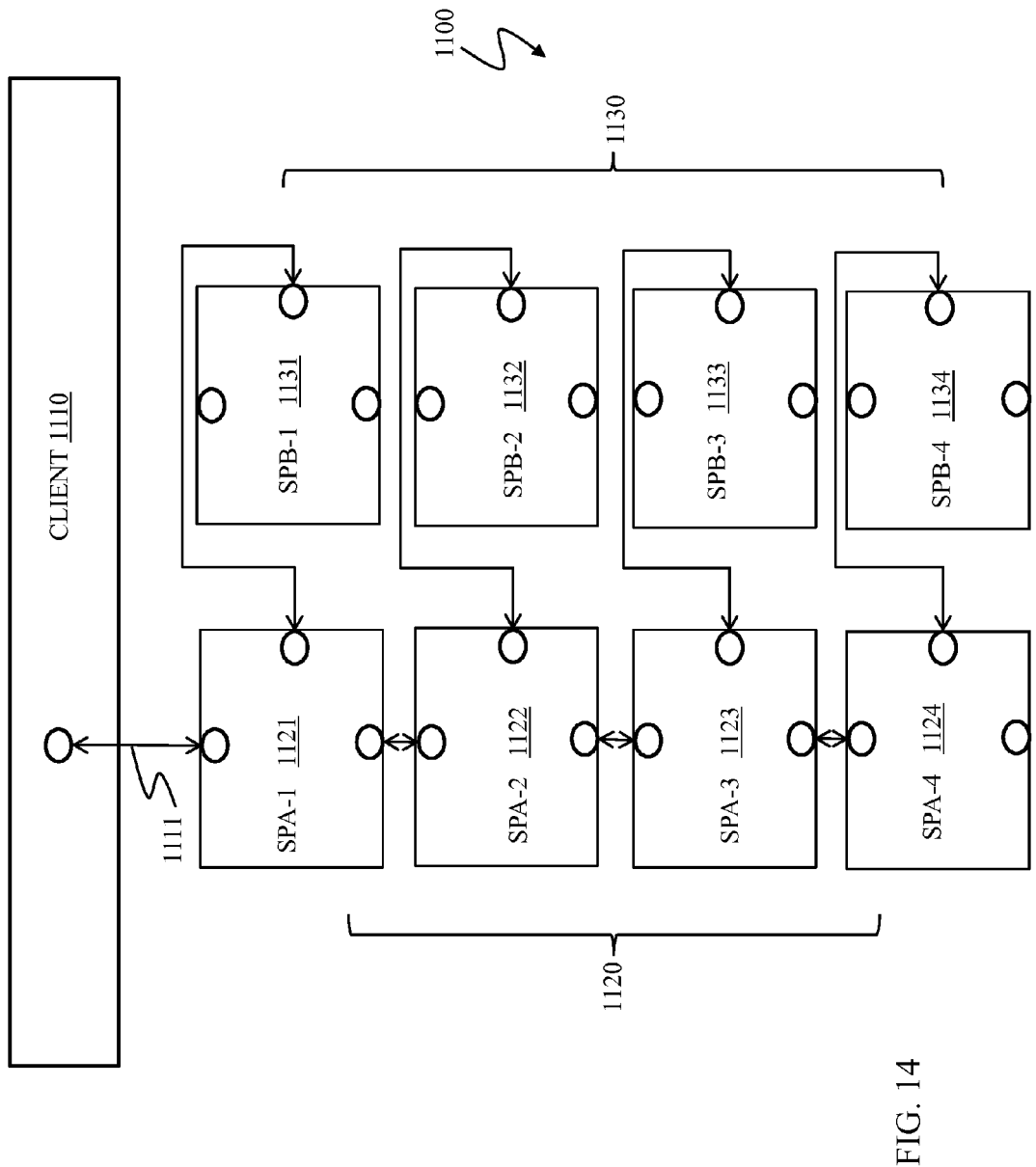
FIG. 14 is a schematic illustration of the storage system showing the logical connections and data paths between the multiple SP pairs to the client device according to an embodiment of the system described herein.

FIG. 14 is a schematic illustration of the storage system 1100 showing the logical connections and data paths between the multiple SP pairs 1121-1124, 1131-1134 to the client device 1110 according to an embodiment of the system described herein. The logical connections and data paths apply to the physical connections shown and described elsewhere herein, for example, with respect to both the storage system 900 and the storage system 1000. The logical connection 1111 of the client device 1110 to the SPA-1 1121 and the logical connections 1120 of the SPAs and the logical connections 1130 of the SPBs are illustrated. In the illustrated embodiment, socket connections are shown with a circle for each of the client device 1110 and the SP pairs 1121-1124, 1131-1134. In various embodiments, the logical connections of the client device and the SP pairs may be made via Ethernet ports and/or may be other types of ports or sockets. For example, the ports shown connecting the peer SPs, that is SPAs to SPBs, may be Ethernet ports and/or may be sockets for internal connections of the peer SPs within a storage enclosure. Further, although, for example, three potential logical socket connections are shown for each SP, these connections may be made by only two Ethernet ports, but in which different connections through the network infrastructure are illustrated as separate logical connections and may be directed, for example, using a router/hub/switch. Accordingly, in various embodiments, the system described herein in connection with the illustrated embodiment may operate with SPs having two Ethernet ports (as shown, for example, in FIGS. 1-3) and/or with Ethernet ports and an internal connection between peer SPs and/or with more than two Ethernet ports. It should be noted that the client device 1110 is shown logically connected to the SPA-1 1121; however, in other embodiments, the client device 1110 may be logically connected to other of the SPs, such as SPB-1 1131.

In an embodiment of the system described herein, when the client device sends out commands to one of the connected SPs, the command may be processed by the first connected SP (e.g., SPA-1 1121). The first SP assesses the command and processes the command only if the command is for that SP. Otherwise, the first SP may pass the command to its SP peer (e.g., SPB-1 1131) and/or to the next connected SP (e.g., SPA-2 1122) through a different socket, as further discussed elsewhere herein. The command will eventually reach the correct destination SP and be processed. Data originating from any given SP to reach the client device 1110 may also be routed as data packets through all of the SPs that are connected between the source SP and the client device 1110. As illustrated, the system described herein may operate with a client device having only one Ethernet port.

Figure 15:
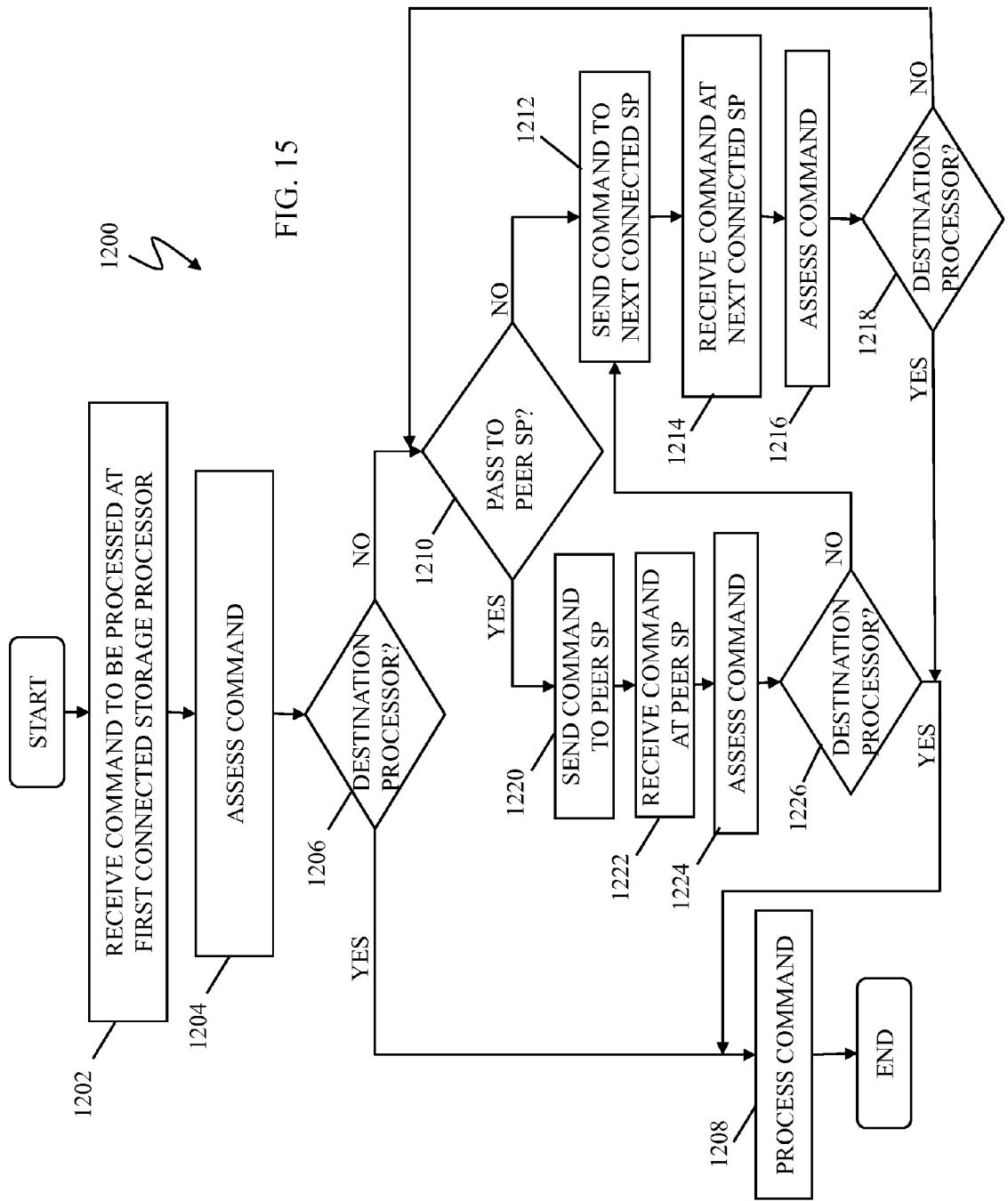
FIG. 15 is a flow diagram showing another embodiment for the processing and transmission of a command from a client device to multiple storage processors according to the system described herein.

FIG. 15 is a flow diagram 1200 showing another embodiment for the processing and transmission of a command from a client testing device to multiple storage processors according to the system described herein. At a step 1202, a first connected SP receives a command from the client testing device. For example, the first connected SP may be an SPA. After the step 1202, processing proceeds to a step 1204 where the command is assessed by the SP for purposes of determining if the SP is the correct destination processor for the command. After the step 1204, processing proceeds to a test step 1206 where it is determined if the current processor is the correct destination processor for the command. If so, then processing proceeds to a step 1208 where the current SP processes the command. After the step 1208, processing is complete. If at the test step 1206, it is determined that the current processor is not the correct destination processor for the command, then processing proceeds to a test step 1210 where it is determined if the command should be passed to the peer SP of the current SP. In various embodiments, the current SP may be able to determine if its peer SP is the likely correct SP. Alternatively, the current SP may be configured to always pass a new received command to its peer SP if the current SP is not the correct destination processor.

If at the test step 1210, the current SP determines that the command should not be passed to its peer SP, then processing proceeds to a step 1212 where the command is sent to the next connected SP. After the step 1212, processing proceeds to a step 1214 where the command is received at the next connected SP, now as the current SP. After the step 1214, processing proceeds to a step 1216 where the command is assessed by the next connected SP for purposes of determining if the SP is the correct destination SP for the command. After the step 1216, processing proceeds to a test step 1218 where it is determined if the current SP is the correct destination SP for the command. If so, then processing proceeds to the step 1208 where the command is processed at the current SP. If not, then processing proceeds back to the test step 1210.

If at the test step 1210, the current SP determines that the command should be passed to its peer SP, then processing proceeds to a step 1220 where the command is sent to the peer SP. After the step 1220, processing proceeds to a step 1222 where the command is received by the peer SP, now as the current SP. After the step 1222, processing proceeds to a step 1224 where the command is assessed. After the step 1224, processing proceeds to a test step 1226 where it is determined if the current SP is the correct destination SP for the command. If so, then processing proceeds to the step 1208 where the command is processed by the current SP. If not, then processing proceeds back to the step 1212 where the command is sent to the next connected SP. Note that the next connected SP in this case may be back to the peer SP that initially sent the command, and eventually passed to a different SP that is the next connected SP, and/or the command may be passed directly to a different connected SP. It should also be noted that, if at test step 1210, the current SP is able to determine that its peer SP is the correct SP, then the assessment step 1224 at the peer SP and the test step 1226 at the peer SP may be avoided, and the command sent directly from the step 1220 to the step 1208 to be processed.

The processes described herein may be controlled by executable code stored on a computer-readable medium on one or more processors and/or client device that executes the steps of the processes.

Accordingly, the system described herein provides a for a storage unit under test that includes multiple storage systems, with the ability to expand the number of storage systems tested using a reduced number of required Ethernet ports on the client device and a reduced number of physical connections on the client device and without being limited to relative physical locations of the client devices and SP pairs. The system described herein also reduces the cost of adding additional Ethernet ports on the client device or adding additional client devices.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

The invention claimed is:

1. A method for communicating with multiple storage systems, comprising:
   receiving a command from a client device at a first storage processor system that is coupled to a second storage processor system via a network infrastructure, wherein each of the first and second storage processor systems includes a first processor and a peer processor;
   assessing the command with respect to a particular one of the first processor and the peer processor of the first storage processor system, wherein assessing the command includes determining if the particular one of the first processor and the peer processor of the first storage processor system is a correct destination processor to process the command, the particular one of the first processor and the peer processor of the first storage system being the correct destination processor if the command corresponds to a storage array that is controlled by the particular one of the first processor and the peer processor of the first storage system;
   wherein, if the particular one of the first processor and the peer processor of the first storage processor system is determined to be the correct destination processor to process the command, then the command is processed; and
   wherein, if the particular one of the first processor and the peer processor of the first storage processor system is determined to not be the correct destination processor, then the command is passed to a different processor via the network infrastructure.

2. The method according to claim 1, wherein the different processor is at least one of: the other of the first processor and the peer processor of the first storage processor system, the first processor of the second storage processor system, and the peer processor of the second storage processor system.

3. The method according to claim 1, wherein a port of the first processor of the first storage processor system is connected to the network infrastructure, a port of the first processor of the second storage processor system is connected to the network infrastructure, a port of the peer processor of the first storage processor system is connected to the network infrastructure, and a port of the peer processor of the second storage processor system is connected to the network infrastructure.

4. The method according to claim 1, wherein, if the command is received at the first processor of the first storage processor system and the first processor of the first storage processor system is determined to not be the correct destination processor, then the command is passed to the first processor of the second storage processor system via the network infrastructure.

5. The method according to claim 1, wherein, if the command is received at the peer processor of the first storage processor system and the peer processor of the first storage processor system is determined to not be the correct destination processor, then the command is passed to the peer processor of the second storage processor system.

6. The method according to claim 1, further comprising:
   transmitting a data packet generated at a source processor via the network infrastructure and at least one of the first storage processor system and the second storage processor system to the client device.

7. The method according to claim 1, further comprising:
at least one additional storage processor system coupled to network infrastructure, wherein the at least one additional storage processor system includes a first processor and a peer processor.

8. The method according to claim 7, wherein, if the command is received at the first processor of the second storage processor system and the first processor of the second storage processor system is determined to not be the correct destination processor, then the command is passed to the first processor of the at least one additional storage processor system via the network infrastructure.

9. The method according to claim 7, wherein, if the command is received at the peer processor of the second storage processor system and the peer processor of the second storage processor system is determined to not be the correct destination processor, then the command is passed to the peer processor of the at least one additional storage processor system via the network infrastructure.

10. A non-transitory computer-readable medium storing computer software for communicating with multiple storage processor systems, the computer software comprising:
executable code that receives a command at a first storage processor system that is coupled to a second storage processor system via network infrastructure, wherein each of the first storage processor system and the second storage processor system includes a first processor and a peer processor;
executable code that determines if a particular one of the first processor and the peer processor of the first storage processor system is a correct destination processor to process the command, the particular one of the first processor and the peer processor of the first storage system being the correct destination processor if the command corresponds to a storage array that is controlled by the particular one of the first processor and the peer processor of the first storage system; and
executable code that passes the command to a different processor if the particular one of the first processor and the peer processor of the first storage processor system is not the correct destination processor to process the command.

11. The non-transitory computer-readable medium according to claim 10, wherein the different processor is at least one of: the other of the first processor and the peer processor of the first storage device, the first processor of the second storage device, and the peer processor of the second storage device.

12. The non-transitory computer-readable medium according to claim 10, wherein, if the command is received at the first processor of the first storage processor system and the first processor of the first storage processor system is determined to not be the correct destination processor, then the command is passed to the first processor of the second storage processor system via the network infrastructure.

13. The non-transitory computer-readable medium according to claim 10, wherein, if the command is received at the peer processor of the first storage processor system and the peer processor of the first storage processor system is determined to not be the correct destination processor, then the command is passed to the peer processor of the second storage processor system via the network infrastructure.

14. The non-transitory computer-readable medium according to claim 10, further comprising:
executable code that transmits a data packet generated at a source processor via the network infrastructure and at least one of the first storage processor system and the second storage processor system to the client device.

* * * * *